March 31, 1970    R. S. WOLOWICZ ET AL    3,503,142
SELF-TESTING DEVICE
Filed May 31, 1968
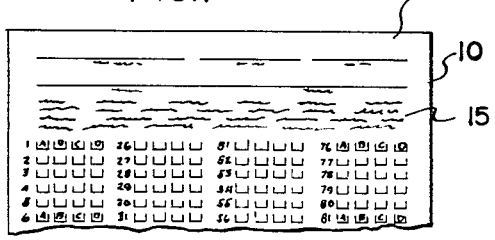
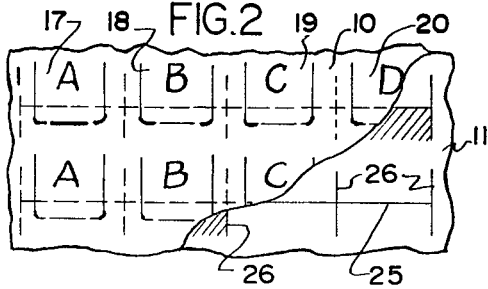
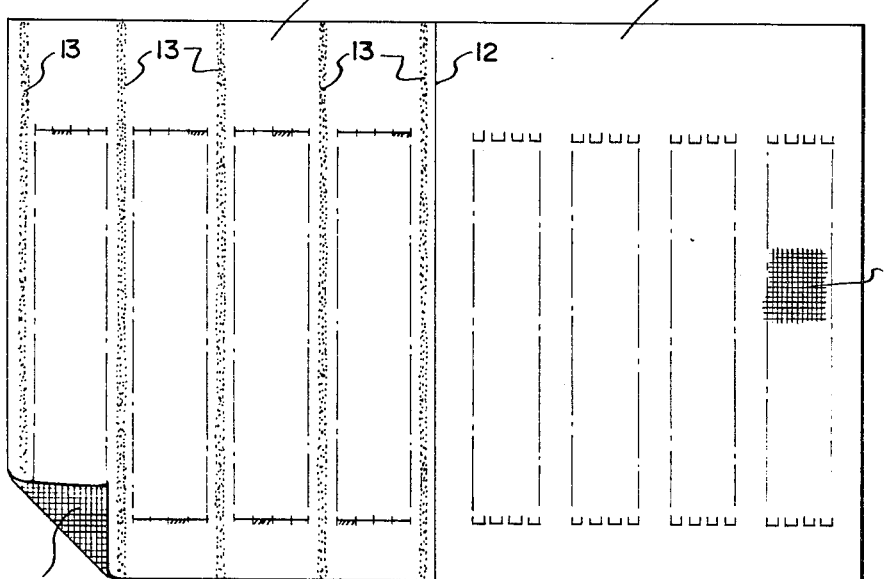
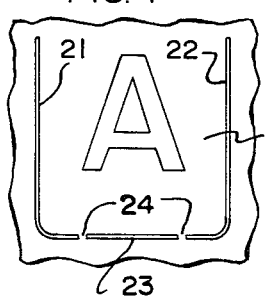
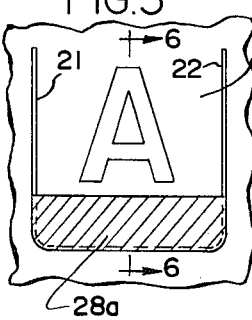
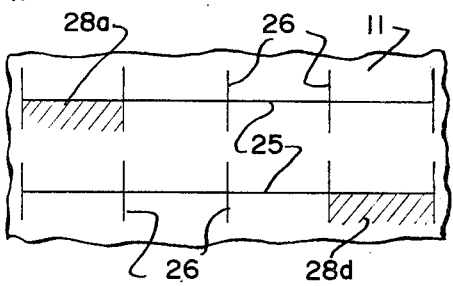
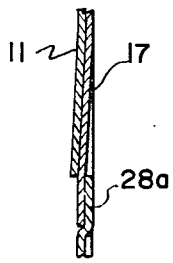
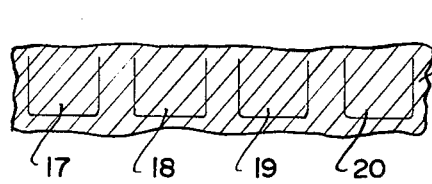
INVENTORS
RICHARD S. WOLOWICZ
ANTHONY R. MANZO JR.
BY *Richard W. Carpenter*
ATTORNEY United States Patent Office 3,503,142
Patented Mar. 31, 1970

3,503,142
SELF-TESTING DEVICE
Richard S. Wolowicz, Wonder Lake, and Anthony R. Manzo, Jr., Elmhurst, Ill., assignors to Container Corporation of America, Chicago, Ill., a corporation of Delaware
Filed May 31, 1968, Ser. No. 733,705
Int. Cl. G09b 3/08
U.S. Cl. 35—9    9 Claims

ABSTRACT OF THE DISCLOSURE

A paperboard device comprising front and rear panels having tabs in the front panel registering with tab-receiving openings in the rear panel. The tabs are in groups and suitably marked to operate by biasing the tabs into the receiving openings and past a coded marginal lip which retais the tab in displaced position. The code mark on the lip is revealed when the tab has been forced past and retained by the lip.

---

This invention relates to a self-testing device suitable for answering multiple-choice questions and for apprising the user immediately if the answers selected are correct. Additionally, the tester is particularly suited to prevent cheating on the part of the user and to facilitate grading by an examiner. Furher, this invention relates to an economical means for fabricating such a tester from cooperating panels or sheets of paperboard or other suitable sheet material which can be readily die-cut, printed and glued together in superposed relation.

Selft-testing devices have been found to be advantageous to students, particularly where the student can be informed immediately if the answer selected is correct. Commonly, multiple-choice questions can be asked in an examination where two, three or four alternatives are given, only one of which may be correct. The tester is capable of use by a student with little or no auxiliary equipment which can, if desired, immediately apprise the student if the answer selected was correct. Quizzing techniques of this sort are particularly advantageous since the student becomes aware immediately of the correct answer, and this exposure adds both to the understanding and retention of the questioned matter.

The present tester may be formed from cooperating front and rear panels of paperboard or other suitable sheet material which are secured together. The front panel is printed with heading spaces for the name of the user and other data required for the examination, and with a column of numbers, indicating the questions, and each number is followed by a series of letters or other indicia identifying the multiple-choice answers.

Immediately beneath the printed mutiple-choice answer there is formed by an appropriately shaped cut a tab structure that can be deflected from the plane of the front or top panel downwardly and through a registering opening formed in the rear or bottom panel. Each front panel tab, when in the plane of the front panel, overlies a marginal rim formed on the rear panel, so that depression of the tab through the registering opening exposes the marginal rim or lip. By appropriately coding the marginal rim, such as by means of colors, the user can determine immediately if the tab selected for the particular question corresponds to the correct answer. To prevent cheating, it is contempltaed that each front panel tab will remain connected by one or more nicks the severance of which will become immediately apparent even though the student is successful in restoring the tab to its original position.

The two cooperating panels are initially die-cut to form the answer tabs and the corresponding tab-receiving openings. The tab-receiving openings may be formed by a plurality of horizontal and vertical slits in the rear panel to produce an H configuration in registry with each answer tab when the panels are secured together. This, in effect creates two opposed, resilient tabs the meeting edge portions of which may be depressed rearwardly of the rear panel when the answer tab is forced against them. The end of the answer tab extends a short distance below the cross bar of the H and when the answer tab is depressed far enough it snaps past the upper edge of the lower tab. When pressure on the answer tab is released, it tends to return to its initial position in the plane of the front panel, but is prevented from doing so by the upper edge portion of the lower tab in the rear panel. This upper edge portion may thus be considered as a lip in the rear panel opening behind which the lower end of the answer tab is retained.

On the front surface of the rear panel the lip portions are printed with an appropriate color code corresponding to the various answers. A color is applied to the lip portion to indicate the correct answer leaving the remaining lips unmarked to indicate a wrong answer. The device may be used selectively for handling two or more examinations and, in such event, the various lip portions would be marked with different colors.

By using metalized or specially treated inks, the sheet could be checked by electronic sensing equipment. The answers could be sensed by mechanically feeling the raised portions of U-tabs after their engagement. Feedback of incorrect answers may indicate requirement for additional instruction in certain areas.

The rear surfaces of either the front or rear panels may be printed with a dark color to preclude or minimize the recognition of a marked lip portion by transmission of light through the panels. Also, the printing of the rear or inside surface of the front panel with a dark color will reduce the possibility of observing a reflection of the colored lip portion from the surface of the front panel, for example, if the user peeked through the slits in the rear panel after first spreading the slits by rolling the joined panels to define a partial cylinder.

FIGURE 1 is a top plan view of the upper portion of a front panel of a tester;

FIGURE 2 is an enlarged fragmentary view of the particular front panel tab construction and the corresponding rear panel opening and marginal rim construction;

FIGURE 3 is a plan view of a blank suitable to form the tester shown in FIGURE 1;

FIGURE 4 is an enlarged view of a single tab as seen from the front of the device showing the same in its original position;

FIGURE 5 is a view corresponding to FIGURE 4 except showing the tab after its free end has been pushed through the opening in the rear panel;

FIGURE 6 is a sectional view as seen generally from line 6—6 in FIGURE 5;

FIGURE 7 is an enlarged view of a fragment of the rear panel of the device corresponding to the left-hand portion of FIGURE 3; and FIGURE 8 is an enlarged fragmentary view of a portion of the front panel, showing a row of answer tabs formed therein.

Referring particularly to FIGURE 3, the tester is preferably formed from a single blank of paperboard comprising front and rear panels 10 and 11 hingedly joined along a fold line 12 and designed to be adhesively secured one against the other along a pluarlity of spaced glue lines 13, 13.

For convenience in using the tester, the upper portion 14 of the front face of panel 10 (see FIGURE 1) is provided with a heading having lines and spaces for the user to insert his name, class, date of examination and other relevant matter. Below the heading 14 is an area 15 in which directions for use of the tester are printed.

The remainder of the front face of panel 10 is printed with a plurality of columns of numbers, and at the side of each number is a series of letters such as A, B, C and D. These numbers correspond to the multiple choice answers to questions contained in the examination with which the tester device is to be used.

As shown in FIGURE 2, letters are preferably printed on the tabs as indicated at 17, 18, 19 and 20. The tabs are formed by splitting the paperboard to define their lateral edges 21 and 22 and by slitting along their lower edges at 23 except for one or more small nicks 24, 24 which hold the lower edge of the tab releasably, whereby the tab can be released by applying pressure thereon to permit its deflection out of the plane of the panel 10.

The rear panel 11 is formed with slits or cuts to provide openings to receive the deflected lettered tabs in the front panel, and the openings are so arranged as to retain the lower end of the tab when deflected. As shown in FIGURES 2 and 7, the rear panel 11 is preferably formed with transverse slits 25, 25, one for each series of lettered tabs. Additional slits 26, 26 are formed across the slits 25 to provide a series of H formations, one for each lettered tab. Each of the H formations is preferably symmetrical with the lettered tab and is somewhat wider than such tab. In effect, the H formations provide upper and lower resilient tabs which are displaced rearwardly or below the plane of the rear panel 11 when a lettered tab is depressed. The lower end of the lettered tab, as shown in FIGURE 2, extends below the upper end of the upwardly directed tab defined by slit 25 and, when the lettered tab is depressed sufficiently, with an instrument such as a pencil, it snaps past the end of the upwardly directed tab and is retained behind the end portion of such tab. This upper end portion of the tab may be referred to as a lip at the opening in the rear panel 11 to retain the end of the lettered tab.

In each set of questions to be used with the present device the numbers of the questions are correlated with the numbers printed on panel 10. In the usual situation only one of the multiple-choice answers is the correct answer and the remainder are incorrect. Thus, in the device illustrated, only one of the answers represented by the letters A, B, C and D is the correct answer. The user of the present device will indicate which answer he believes to be correct by depressing one of the lettered tabs.

For each set of questions and multiple-choice answers the code panel 11 bears coded indicators arranged underneath the lettered tabs on panel 10 so that, when any given tab is depressed, the user is apprised immediately as to whether he has answered the question correctly. For coding purposes the lip of the material of panel 11 formed by the upwardly directed tab, the edge of which is defined by slit 25, is suitably marked or printed with a color or marked in some other distinctive manner to indicate that the answer identified by the letter on the tab is correct. The separate lips of the material of panel 11 below the other lettered tabs will bear some other marking or they may simply be left unmarked to signify that the answer selected is incorrect. It is accordingly, intended that references herein to coded tabs may apply both to marked and unmarked tabs.

As shown in FIGURE 7, the marking indicated by shaded areas 28a and 28d is considered satisfactory. The area 28a is initially covered by the tab 17 bearing the letter A, as shown, in FIGURE 4 and, when this tab is depressed to engage it behind the underlying lip, the coded area 28a is exposed to show that the correct answer has been selected.

The small nicks 24, as best shown in FIGURE 4, which retain the lettered tabs releasably, serve to make the tester relatively cheat-proof because the fact that the nicks have been severed is apparent even though a depressed lettered tab might be disengaged from its retaining lip and restored to the plane of panel 10. It is also contemplated that the nicks for retaining the tabs releasably can be formed on the lateral edges of the tabs.

For the purpose of preventing the user of the device from locating coded areas on panel 11 by directing a ray of light through the superposed panels, the panel 11 may be rendered relatively opaque by dark colored printing 30 upon its rear face. The rear face of the front panel 10 may also be printed in this manner if desired. By providing a dark surface 31 on the back of panel 10 the reflection of the coded areas from such surface is minimized. This is a consideration in the event the user makes an attempt to locate the colored areas by partially rolling the sheet to widen the slit openings on the exposed rear face of the panel 11.

When it is desired to apply a dark colored surface on the rear side of the rear panel 11, it is advantageous to apply such printing to the rear panel while the blank is in spread-out condition so that it may be applied at the same time that the tab indicia and other matter is printed on the face of the front panel. Thus, both printings can be effected in one pass through the press.

An advantageous manner of employing the testers is to supply them to instructors without coded areas marked thereon. In such case the testers would be left unglued and the blank, in spread-out form, would have the code marks applied by a special coding machine used by the instructor shortly before the examination. The panels would then be sealed in superposed relation by heat healing or by suitable glue.

It is additionally contemplated that the testers can be utilized to advantage without printing the main panel 10 either with tab indicia or with numerals to indicate the question numbers. In the event the tab indicia and question numbers are not printed on the main panel, they can be applied manually by the student at the time of taking the examination; or the student could fill in only the question numbers and leave the tabs unmarked.

The glue lines 13 are applied along the margins of the panels as well as in between the vertical rows of indicia, and such glue lines preferably extend the entire length of the panels and at a distance below the rows of indicia so that the sheets cannot be spread sufficiently at the ends to enable the user to see the code marks applied to panel 11 in either the upper or lower ends of the rows. Glue lines could of course, be applied transversely both above and below the columns of indicia, but by extending the lines, as shown, well above and below the ends of the columns, such glue lines effectively surround the indicia to prevent improper viewing thereof.

For convenience of description the testing device is considered to be disposed in a horizontal position and the released tabs are generally referred to as moving downward out of the plane of the main panel. Also, even though the device is supported horizontally, the edge of the device which is opposite the heading may be considered as the lower end of the device, and the ends of the main panel tabs opposite their hinge connections are referred to as the lower ends of the tabs.

While the question numerals are shown in vertical rows and the multiple-answer tabs and indicia are arranged transversely of the panels, it is obvious that the numbers could be arranged transversely of the sheet and the answer tabs could be arranged in vertical rows, also with corresponding changes in the coded areas applied to the rear panel.

While the present description sets forth a preferred embodiment of the invention, numerous specific changes may be made in the tester as disclosed without departing from the spirit of the invention, and it is therefore desired that the present embodiment be considered as illustrative and not restrictive, reference being had to the appended claims

We claim:

1. In a self-testing device designed to apprise the user immediately the correctness of an answer selected for a multiple-choice question, the combination of
   (a) a main panel of resilient sheet material having a row of tabs therein formed by U-shaped slits cut in such panel, the free end portions of such tabs being individually deflectable out of the plane of the panel by application of pressure on the tab; and
   (b) a code panel member for association with the rear face of the main panel, such code panel member having lip portions formed therein to extend across the paths of the free ends of the tabs and past which such tab free ends may move with a snap action to retain the end portion of a deflected tab below a lip portion, whereby a code marking applied to such lip portion will become visible.

2. The invention as defined in claim 1 in which the code panel member is designed to be secured flat against the rear face of the main panel, such code panel member being formed with a plurality of H-shape slits in general registration with the individual main panel tabs when the two panels are secured together, said H-shaped slits being wider than the main panel tabs and, in effect, forming pairs of upper and lower, rearwardly deflectable tabs, the registering main panel tab being disposed so that its free edge overlaps the lip-forming edge of the upwardly directed lower tab, whereby the main panel tab, upon being depressed or deflected rearwardly, will first deflect the upper and lower tabs of the code panel and will snap past the lip-forming edge of the lower tab to be retained thereby when pressure on the main panel tab is released.

3. The invention as defined in claim 1 in which the slit which forms one edge of the main panel tab is interrupted by at least one small nick to maintain such tab edge integrally connected to the adjacent edge of the panel, the severance of such connecting nick in the normal use of the device being an indication that the tab has been deflected.

4. The invention as defined in claim 3 in which the connecting nick is located on the lower edge of the tab.

5. A self-testing device designed to apprise the user immediately of the correctness of an answer selected for a multiple-choice question, comprising in combination:
   (a) a main panel of resilient paperboard having printed on its front face a plurality of systematically arranged groups of indicia corresponding to various possible answers to a particular question;
   (b) the individual indicia of each group having a plurality of individual tabs associated therewith, such tabs being formed by U-shaped slits cut in the main panel, whereby the application of pressure against the face of any tab will displace the free end of such tab rearwardly out of the plane of the main panel; and
   (c) a coded panel member associated with the rear face of the main panel, such coded panel member having lip portions extending across the paths of the free ends of the tabs past which such tab free ends may move with a snap action to retain the ends of the displaced tabs, at least one of the lip portions exposed by the displacement of the free end of a tab in a given group of tabs having a distinctive surface marking to indicate that a correct answer has been selected by the user.

6. The invention as defined in claim 5 in which the groups of indicia on the face of the main panel are spaced apart and the coded panel member is adhesively secured to the main panel member in areas surrounding such groups of indicia.

7. The invention as defined in claim 5 in which the individual indicia are applied directly upon the faces of the deflectable tabs.

8. The invention as defined in claim 5 in which the coded panel member is substantially opaque, to prevent transmission of light therethrough, whereby the locations of the surface markings on the lip portions might otherwise be determined.

9. The invention as defined in claim 5 in which the coded panel is of a size commensurate with the main panel and in which the coded panel has an opaque coating on its outer face, said panels being initially hinged together along a common edge enabling them to be folded readily one against the other and adhesively secured, the outer faces of said panels in unfolded, or spread-out condition being on the same side, whereby the indicia on the main panel and the opaque coating on the coded panel may be printed on the same pass through a press.

References Cited

UNITED STATES PATENTS

| 2,155,814 | 4/1939 | Wolfe | 35—9 |
| 3,283,416 | 11/1966 | Taylor et al. | 35—9 |

EUGENE R. CAPOZIO, Primary Examiner

WILLIAM H. GRIEB, Assistant Examiner

U.S. Cl. X.R.

35—48